US008879810B2

(12) United States Patent
Feng et al.

(10) Patent No.: US 8,879,810 B2
(45) Date of Patent: Nov. 4, 2014

(54) METHOD AND SYSTEM FOR AUTOMATIC LUNG SEGMENTATION IN MAGNETIC RESONANCE IMAGING VIDEOS

(71) Applicants: Shaolei Feng, Plainsboro, NJ (US); Shaohua Kevin Zhou, Plainsboro, NJ (US); Andre de Oliveira, Erlangen (DE); Berthold Kiefer, Erlangen (DE); Jingdan Zhang, Plainsboro, NJ (US)

(72) Inventors: Shaolei Feng, Plainsboro, NJ (US); Shaohua Kevin Zhou, Plainsboro, NJ (US); Andre de Oliveira, Erlangen (DE); Berthold Kiefer, Erlangen (DE); Jingdan Zhang, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 102 days.

(21) Appl. No.: 13/678,916

(22) Filed: Nov. 16, 2012

(65) Prior Publication Data

US 2013/0121545 A1 May 16, 2013

Related U.S. Application Data

(60) Provisional application No. 61/560,383, filed on Nov. 16, 2011.

(51) Int. Cl.
*G06K 9/00* (2006.01)
*G06T 7/00* (2006.01)
*A61B 6/00* (2006.01)

(52) U.S. Cl.
CPC ..... *G06T 7/0014* (2013.01); *G06T 2207/30061* (2013.01); *G06T 2207/20081* (2013.01); *G06T 7/0089* (2013.01); *G06T 2207/10076* (2013.01); *G06T 7/0083* (2013.01); *G06T 2207/20124* (2013.01); *G06T 7/0087* (2013.01); *G06T 2207/20076* (2013.01)
USPC .............................. 382/128; 382/224; 378/21

(58) Field of Classification Search
USPC ......... 382/100, 103, 106–107, 128–134, 162, 382/173, 181, 196, 199, 224, 232, 254, 274, 382/276, 286, 291, 294, 305, 312; 378/4, 6, 378/21
See application file for complete search history.

(56) References Cited

U.S. PATENT DOCUMENTS

| 6,282,307 | B1 | 8/2001 | Armato, III et al. | |
| 6,724,925 | B2 * | 4/2004 | Armato et al. | 382/132 |
| 7,315,639 | B2 | 1/2008 | Kuhnigk | |
| 7,756,316 | B2 * | 7/2010 | Odry et al. | 382/131 |
| 7,916,919 | B2 | 3/2011 | Zheng et al. | |
| 8,073,220 | B2 | 12/2011 | Khamene et al. | |
| 2008/0101676 | A1 * | 5/2008 | Zheng et al. | 382/131 |
| 2010/0080434 | A1 * | 4/2010 | Seifert et al. | 382/131 |
| 2010/0266170 | A1 * | 10/2010 | Khamene et al. | 382/128 |

\* cited by examiner

*Primary Examiner* — Seyed Azarian

(57) ABSTRACT

A method and system for automatic lung segmentation in magnetic resonance imaging (MRI) images and videos is disclosed. A plurality of predetermined key landmarks of a lung are detected in an MRI image. The key landmarks may be detected using discriminative joint contexts representing combinations of multiple key landmarks. A lung boundary is segmented in the MRI image based on the detected key landmarks. The landmark detection and the lung boundary segmentation can be repeated in each frame of an MRI video.

27 Claims, 8 Drawing Sheets

METHOD AND SYSTEM FOR AUTOMATIC LUNG SEGMENTATION IN MAGNETIC RESONANCE IMAGING VIDEOS

This application claims the benefit of U.S. Provisional Application No. 61/560,383, filed Nov. 16, 2011, the disclosure of which is herein incorporated by reference.

BACKGROUND OF THE INVENTION

The present invention relates to lung segmentation, and more particularly, to automatic lung segmentation in magnetic resonance imaging (MRI) videos.

With recent significant developments in the field of magnetic resonance imaging (MRI), MRI chest imaging recently entered the clinical arena and is commonly used in clinical applications. In particular, MRI is increasingly used as a first-line imaging modality for various lung diseases, such as cystic fibrosis, pulmonary hypertension, and even lung cancer. MRI videos also provide benefits for visualizing various aspects of lung functions, such as respiratory motion, perfusion, ventilation, and gas exchanges. Automatic lung segmentation is desirable in order to accelerate the diagnosis procedure and reduce examination time.

BRIEF SUMMARY OF THE INVENTION

The present invention provides a method and system for lung segmentation in magnetic resonance imaging (MRI) videos. Embodiments of the present invention segment the lungs in a progressive manner by first detecting key landmarks of the lung, and then deforming a shape statistically obtained from training data, using a thin plate splines transform with constrains of the detected key landmarks.

In one embodiment of the present invention, a plurality of predetermined key landmarks of a lung are detected in a medical image. A lung boundary is segmented in the medical image based on the detected key landmarks. The key landmarks may be detected by detecting one or more discriminative joint contexts, each discriminative joint context representing a combination of two or more of the key landmarks. The key landmark detection and the lung boundary segmentation can be repeated in each frame of medical image sequence.

These and other advantages of the invention will be apparent to those of ordinary skill in the art by reference to the following detailed description and the accompanying drawings.

DETAILED DESCRIPTION

The present invention is directed to a method and system for automatic lung segmentation in medical images, such as magnetic resonance imaging (MRI) videos. Embodiments of the present invention are described herein to give a visual understanding of the lung segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Figure 1:
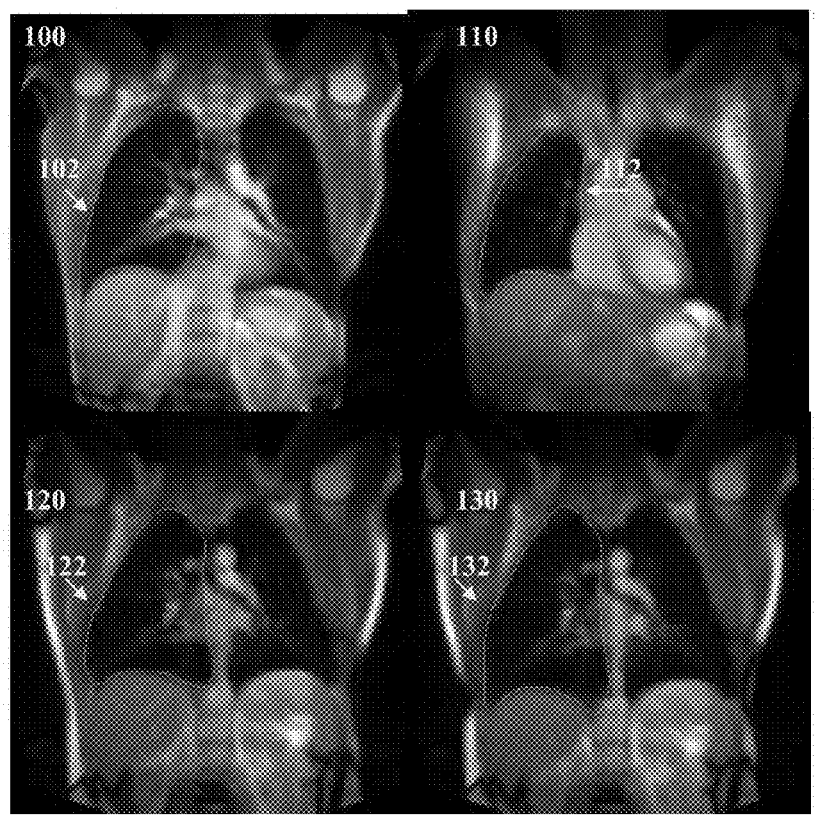
FIG. 1 illustrates examples of lungs in MRI images.

Lung segmentation is important for evaluation of lung ventilation and diagnosis of many pulmonary diseases. Automatic segmentation of the lungs is a challenging task because of large variations in the shape and size of the lungs in different patients, as well as variations in contrast between different MRI scans. FIG. 1 illustrates examples of lungs in MRI images. As shown in FIG. 1, lungs 102, 112, 122, and 132 in images 100, 110, 120, and 130, respectively, have a large variance of shapes. Embodiments of the present invention address these challenges using a progressive scheme, which is based on database-driven machine learning algorithms, to automatically segment the lungs in MRI images/videos. Embodiments of the present invention utilize a two-stage lung segmentation method that works in a progressive manner. The first stage is the detection of predetermined key landmarks of the lung. The detected key landmarks define the course location, orientation, and size of the lung in the images. The second stage segments the whole lung with a closed boundary.

Figure 2:
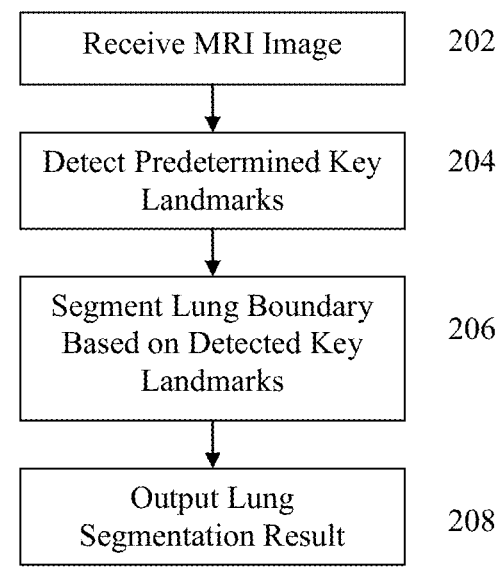
FIG. 2 illustrates a method of lung segmentation according to an embodiment of the present invention.

FIG. 2 illustrates a method of lung segmentation according to an embodiment of the present invention. As illustrated in FIG. 2, at step 202, an MRI image is received. The MRI image can be a 2D or 3D MRI image. The MRI image may be part of a sequence of MRI images (i.e., a frame of an MRI video). The MRI image may be received directly from an MRI scanner. For example, the MRI image can be received in real time from the MRI scanner as the MRI image is acquired by the MRI scanner. It is also possible, that the MRI image can be received by loading a previously stored MRI image.

Figure 3:
FIG. 3 illustrates a lung boundary representation and key landmarks of the lung.

At step 204, a set of predetermined key landmarks of the lung are detected in the MRI image. The key landmarks define a rough shape of the lung and are consistent over different lung images. The key landmarks are used to fit a lung boundary model to the MRI image. In one embodiment, the following four key landmarks are detected: the top-most point of the lung, the lower-left corner of the lung, the middle top point of the bottom edge lung, and the lower-right corner point of the lung. However, it is to be understood that the present invention is not limited to these particular landmarks or any particular number of landmarks. FIG. 3 illustrates the lung boundary representation and the key landmarks. As illustrated in FIG. 3, lung boundary 300 is represented using 17 control points 302, 304, 306, 308, 310, 312, 314, 316, 318, 320, 322, 324, 326, 328, 330, 332, and 334, The key landmarks are the top-most point 302, the lower-left corner point 326, the middle top point of the bottom edge 330, and the lower-right corner point 334.

Using the key landmarks to fit a lung boundary to the MRI image provides robustness to noise because around the key landmarks the appearance of the lungs is most consistent over different MRI images. Further, the key landmark based detection is very fast in terms of computational speed. In a possible implementation, a separate machine-learning based detector, such as a probabilistic boosting tree (PBT) classifier, can be trained for each key landmark based on annotated training data, and each key landmark can be detected in the MRI image using the respective trained detector. In an alternate advantageous implementation, in order to overcome the problem of false positives due to similar local structures over the entire image, combinations of key landmarks can be detected rather than individual landmarks. In particular, a set of predetermined discriminative joint contexts, each representing a combination of two or more of the key landmarks are detected. Additionally, while some key landmarks are detected in combination, other key landmarks may still be detected individually. For such landmarks, a bounding box representing a predetermined context surrounding the landmark may be detected in the MRI image instead of just detected the landmark point.

Figure 4:
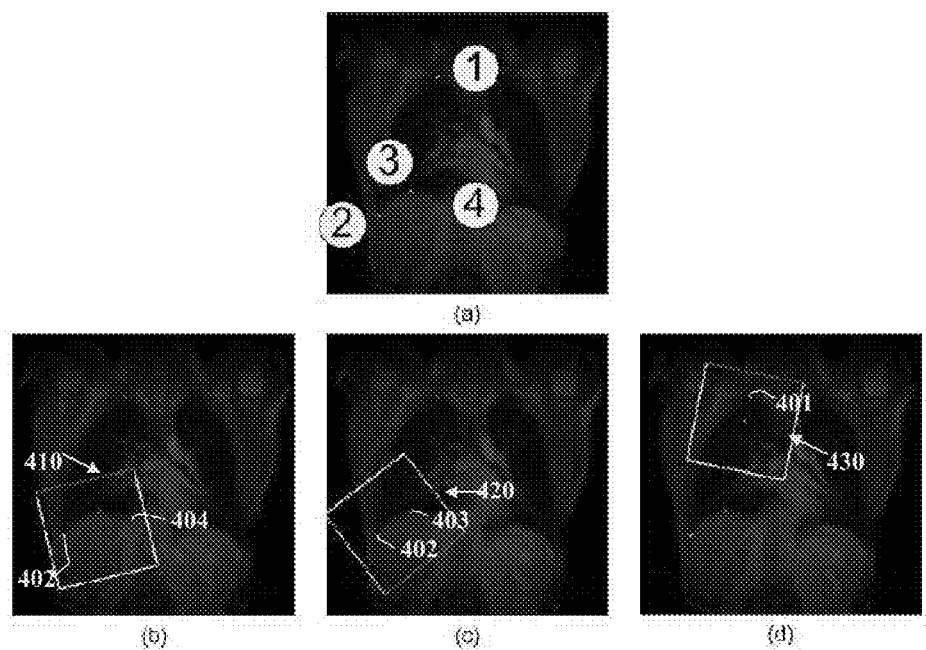
FIG. 4 illustrates key landmark detection using joint contexts representing combinations of key landmarks.

FIG. 4 illustrates key landmark detection using joint contexts representing combinations of key landmarks. As illustrated in FIG. 4, image (a) shows four key landmark points. As shown in image (a), landmark 1 is the top-most point, landmark 2 is the lower-left corner, landmark 3 is the middle top point of the bottom edge, and landmark 4 is the lower-right coroner. Image (b) shows the joint context 410 between landmark 2 (402) and landmark 4 (404). The joint context 410 is defined by a bounding box that includes a predetermined region surrounding landmarks 2 and 4 and whose direction is defined by the direction of a line connecting landmarks 2 and 4. Accordingly, when the position, orientation, and scale of the joint context 410 is detected in an MRI image, the positions of landmarks 2 and 4 in the MRI are defined by the detected joint context 410. Image (c) shows the joint context 420 between landmark 2 (402) and landmark 3 (403). The joint context 420 is defined by a bounding box that includes a predetermined region surrounding landmarks 2 and 3 and whose direction is defined by the direction of a line connecting landmarks 2 and 3. Accordingly, when the position, orientation, and scale of the joint context 420 is detected in an MRI image, the positions of landmarks 2 and 3 in the MRI are defined by the detected joint context 420. Image (d) shows the context 430 for landmark 1 (401). The context 430 is a bounding box that includes a predetermined regions surrounding landmark 1 and whose direction is defined by the direction of a line connecting landmark 1 and landmark 3. Accordingly, when the position, orientation, and scale of the context 430 is detected in an MRI image, the position of landmark 1 is the MRI image is defined by the detected context 430.

For each context, marginal space learning (MSL) based classifiers can be used to detect the position, orientation, and scale of the context in the MRI image. MSL is used to estimate the position, orientation, and scale of an object (in this case, a bounding box defining the respective context) in a 3D volume or 2D image using a series of detectors trained using annotated training data. In order to efficiently localize an object using MSL, parameter estimation is performed in a series of marginal spaces with increasing dimensionality. Accordingly, the idea of MSL is not to learn a classifier directly in the full similarity transformation space, but to incrementally learn classifiers in the series of marginal spaces. As the dimensionality increases, the valid space region becomes more restricted by previous marginal space classifiers. The object detection (object pose estimation) is split into three steps: object position estimation, position-orientation estimation, and position-orientation-scale estimation. A separate classifier is trained based on annotated training data for each of these steps. This results in an estimated transformation (position, orientation, and scale) of the object (bounding box). MSL is described in greater detail in U.S. Pat. No. 7,916,919, issued Mar. 29, 2011, and entitled "System and Method for Segmenting Chambers of a Heart in a Three Dimensional Image", which is incorporated herein by reference.

Once the bounding boxed corresponding to the various contexts are detected in the MRI image using MSL, each key landmark is defined in the MRI based on the detected contexts. It is possible that a key landmark may be defined in more than one context. For example, in FIG. 4, landmark 2 (the lower-left corner point) is defined in both joint context 410 and joint context 420. In this case, the detection scores of the joint contexts resulting from the MSL-based detection can be compared and the key landmark can be defined in the MRI image using the joint context having the higher detection score. Alternatively, it is also possible that the position of the key landmark be determined by some combination of the joint contexts, for example, using an average or weighted average of the positions in the joint contexts.

Returning to FIG. 2, at step 206, the lung boundary in the MRI image is segmented based on the detected key landmarks. In particular, an initial lung boundary can be defined using the key landmarks based on a mean shape of all lung boundaries in a set of training data. However, the variation of lung shapes between different patients can be large. In order to achieve accurate segmentation of the lung in the MRI image, shape models can be used to capture the main attributes of lung shapes by statistically learning from the training data and boundary detectors can be trained for the refinement of lung boundaries based on image information in the MRI image.

Figure 5:
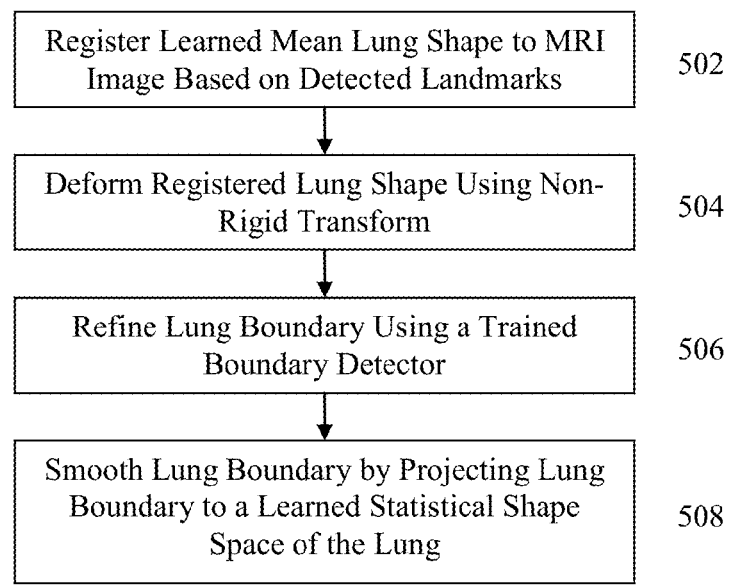
FIG. 5 illustrates a method for segmenting the lung boundary in the MRI image based on the detected key landmarks, according to an embodiment of the present invention.

FIG. 5 illustrates a method for segmenting the lung boundary in the MRI image based on the detected key landmarks, according to an embodiment of the present invention. The method of FIG. 5 can be used to implement step 206 of FIG. 2. As illustrated in FIG. 5, at step 502, a learned mean lung shape is registered to the MRI image based on the detected key landmarks. The mean lung shape is a mean shape of the lung boundaries calculated from a set of annotated training images. The mean lung shape can be represented as a model having a number of control points, such as the lung boundary representation 300 of FIG. 3. A rigid transformation is calculated to optimally register the key landmarks points of the mean lung shape with the detected key landmark points in the MRI image. The rigid transform is then applied to entire mean lung shape to register the mean lung shape to the MRI image, resulting in an initial lung boundary in the MRI image.

At step 504, the rigidly transformed mean lung shape is non-rigidly deformed to fit the lung boundaries in the MRI image. For example, the lung boundary initialized using the rigid transformation can be deformed using a non-rigid transform, such as a thin plate splines (TPS) transform, based on the detected key landmarks and the corresponding landmarks in the mean lung shape.

At step 506, the lung boundary is refined using a trained boundary detector. The boundary detector is trained based on annotated training data. For example, the boundary detector may be a trained probabilistic boosting tree (PBT) classifier. For each point on the lung boundary in the MRI image, the trained boundary detector refined the boundary point by searching along a normal direction in a neighborhood of the boundary point for a point that has a highest probability of being on the lung boundary.

At step 508, the lung boundary is smoothed by projecting the lung boundary onto a learned statistical shape space of the lungs. In particular, a principle component analysis (PCA) shape space can be learned from the set of training data to describe a variance of the lungs in the training data. The lung boundary is projected to the learned PCA sub-space of the lungs in order achieve a smooth lung boundary.

Returning to FIG. 2, at step 208, the lung segmentation results are output. The lung segmentation results can be output by displaying the lung segmentation results, for example, on a display device of a computer system. The lung segmentation results can also be output by storing the lung segmentation results, for example, in a memory or storage of a computer system.

Figure 6:
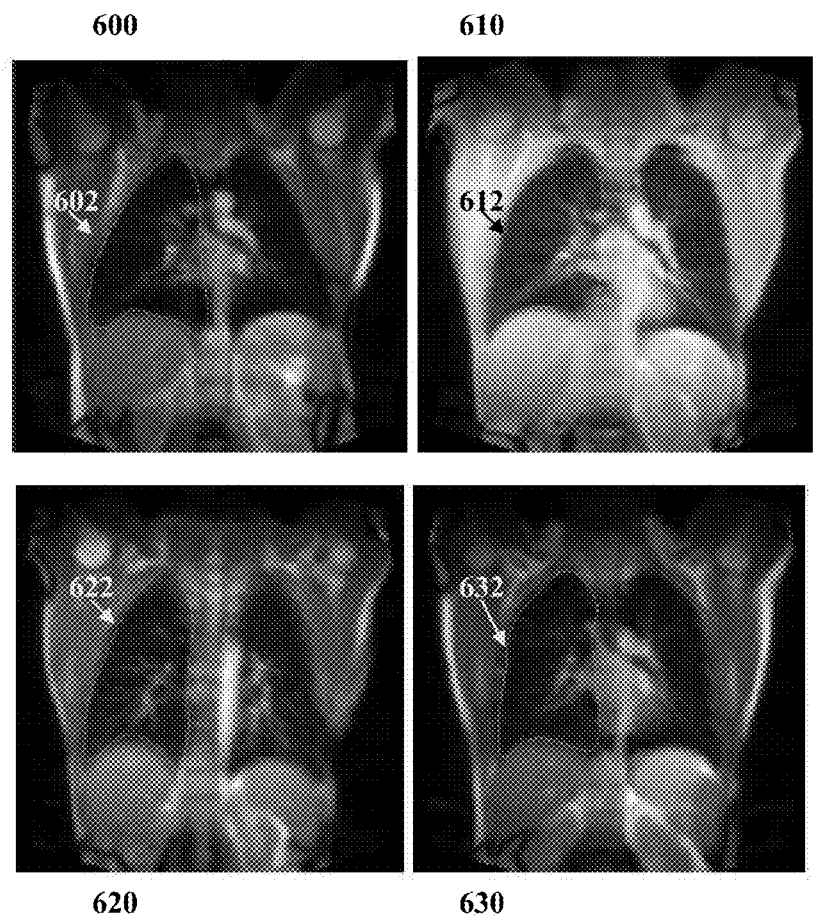
FIG. 6 illustrates exemplary lung segmentation results using the method of FIG. 2.

FIG. 6 illustrates exemplary lung segmentation results using the method of FIG. 2. As illustrated in FIG. 6, lung boundaries 602, 612, 622, and 632 are detected MRI images 600, 610, 620, and 630, respectively. Although FIG. 6 shows segmentation results for a single lung in each image, it is to be understood that the method of FIG. 2 can be applied similarly to segment the left lung, the right lung, or both lungs in a particular MRI image.

Figure 7:
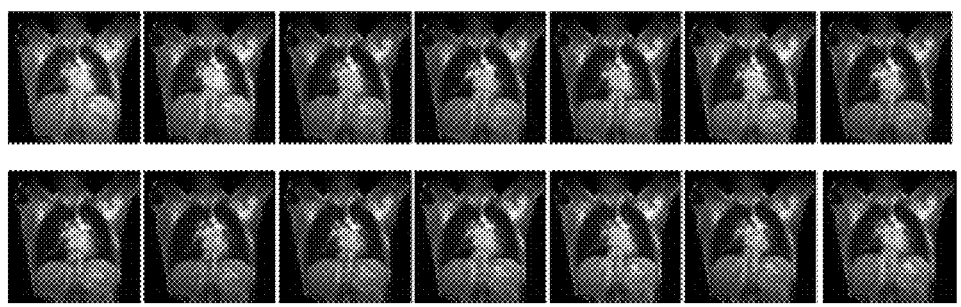
FIG. 7 illustrates an exemplary sequence of MRI images extracted from an MRI video.

In an advantageous embodiment of the present invention, the method of FIG. 2 can be used to segment the lungs in each frame of the MRI image sequence. FIG. 7 illustrates an exemplary sequence of MRI images extracted from an MRI video. The method of FIG. 2 can be repeated for each MRI image (frame) in the sequence of MRI images in order to segment the lungs in each MRI image in the MRI image sequence.

Although embodiments of the present invention are described herein as segmenting lung boundaries in MRI images, the present invention is not limited thereto, and the method of FIG. 2 may be similarly applied to other imaging modalities, such as computed tomography (CT), ultrasound, X-ray, etc.

Figure 8:
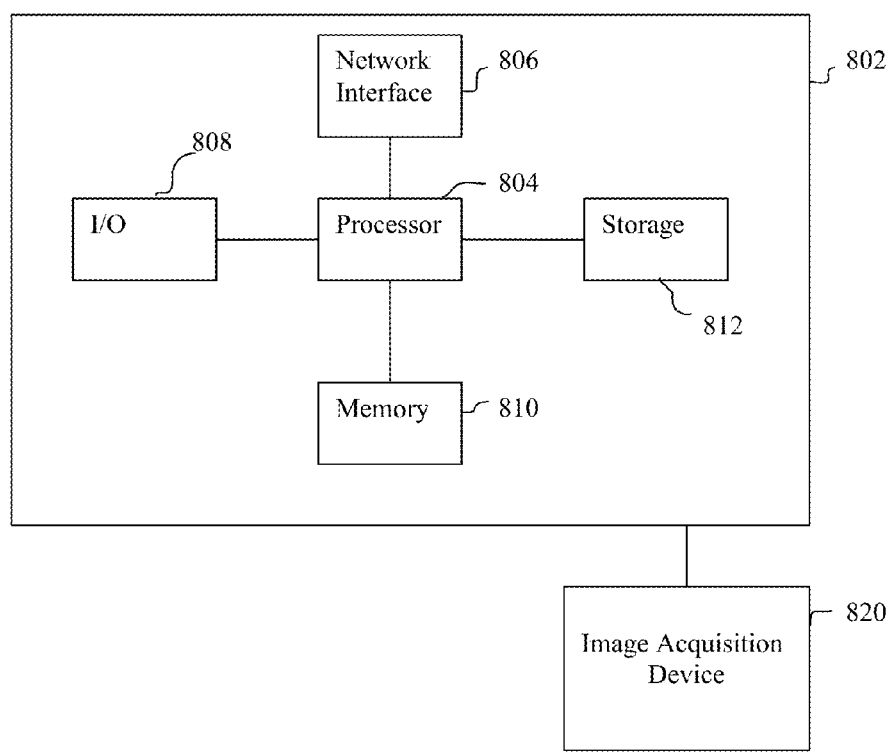
FIG. 8 is a high level block diagram of a computer capable of implementing the present invention.

The above-described methods for lung segmentation in MRI images may be implemented on a computer using well-known computer processors, memory units, storage devices, computer software, and other components. A high level block diagram of such a computer is illustrated in FIG. 8. Computer 802 contains a processor 804 which controls the overall operation of the computer 802 by executing computer program instructions which define such operation. The computer program instructions may be stored in a storage device 812, or other computer readable medium (e.g., magnetic disk, CD ROM, etc.) and loaded into memory 810 when execution of the computer program instructions is desired. Thus, the steps of the methods of FIGS. 2 and 5 may be defined by the computer program instructions stored in the memory 810 and/or storage 812 and controlled by the processor 804 executing the computer program instructions. An image acquisition device 820, such as an MRI scanner, can be connected to the computer 802 to input images to the computer 802. It is possible to implement the image acquisition device 820 and the computer 802 as one device. It is also possible that the image acquisition device 820 and the computer 802 communicate wirelessly through a network. The computer 802 also includes one or more network interfaces 806 for communicating with other devices via a network. The computer 802 also includes other input/output devices 808 that enable user interaction with the computer 802 (e.g., display, keyboard, mouse, speakers, buttons, etc.). One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of lung segmentation in a medical image, comprising:
 detecting a plurality of predetermined key landmarks of a lung in the medical image, wherein detecting a plurality of key landmarks of a lung in the medical image comprises:
  detecting one or more discriminative joint contexts in the medical image, each discriminative joint context representing a combination of two or more of the key landmarks, using a respective classifier trained for each discriminative joint context; and
 segmenting a lung boundary in the medical image based on the detected key landmarks.

2. The method of claim 1, wherein detecting one or more discriminative joint contexts in the medical image, each discriminative joint context representing a combination of two or more of the key landmarks, using a respective classifier trained for each discriminative joint context comprises:
 detecting each of position, orientation, and scale of each discriminative joint context using marginal space learning (MSL).

3. The method of claim 1, wherein detecting a plurality of predetermined key landmarks of a lung in the medical image further comprises:
 determining a position of each key landmark based on one of the discriminative joint contexts including that key landmark.

4. The method of claim 3, wherein determining a position of each key landmark based on one of the discriminative joint contexts including that key landmark comprises:
 for a key landmark included in more than one of the discriminative joint contexts, determining a position of the key landmark based on the discriminative joint context having a highest detection score of the discriminative joint contexts including the key landmark.

5. The method of claim 1, wherein detecting a plurality of predetermined key landmarks in the medical image comprises:
 detecting a top most point of the lung, a lower-left corner point of the lung, a middle top point of a bottom edge of the lung, and a lower-right corner point of the lung in the medical image.

6. The method of claim 5, wherein detecting a top most point of the lung, a lower-left corner point of the lung, a middle top point of a bottom edge of the lung, and a lower-right corner point of the lung in the medical image comprises:
 detecting a first bounding box defining joint context of the lower-left corner point and the lower-right corner point in the medical image;

detecting a second bounding box defining a joint context of the lower-left corner point and the middle top point of the bottom edge in the medical image; and detecting a third bounding box defining a context of the top most point.

7. The method of claim 6, wherein detecting a top most point of the lung, a lower-left corner point of the lung, a middle top point of a bottom edge of the lung, and a lower-right corner point of the lung in the medical image further comprises:

determining a position of the top most point in the medical image based on the third bounding box;

determining a position of the lower-right corner point in the medical image based on the first bounding box;

determining a position of the middle top point of the bottom edge in the medical image based on the second bounding box; and determining a position of the lower-left corner point in the medical image based on one of the first bounding box and the second bounding box having a higher detection score.

8. The method of claim 1, wherein segmenting a lung boundary in the medical image based on the detected key landmarks comprises:

initializing a lung boundary in the medical image by registering a learned mean shape of the lung to the medical image using a non-rigid transformation based on the detected key landmarks;

deforming the lung boundary in the medical image using a non-rigid transform; and refining the lung boundary using a trained boundary detector deforming the lung boundary in the medical image using a non-rigid transform.

9. The method of claim 8, wherein deforming the lung boundary in the medical image using a non-rigid transform comprises:

deforming the lung boundary using a thin plate splines (TPS) transform based on the detected key landmarks and corresponding landmarks in the learned mean shape of the lung.

10. The method of claim 8, wherein refining the lung boundary using a trained boundary detector deforming the lung boundary in the medical image using a non-rigid transform;

for each of a plurality boundary points on the lung boundary, searching in a normal direction from that boundary point for a point having a highest detection score by the trained boundary detector.

11. The method of claim 8, wherein segmenting a lung boundary in the medical image based on the detected key landmarks further comprises:

smoothing the lung boundary by projecting the lung boundary onto a learned statistical shape space of the lung.

12. The method of claim 1, further comprising:

repeating the detecting and segmenting steps for each frame of a medical image sequence.

13. The method of claim 1, wherein the medical image is a magnetic resonance imaging (MRI) image.

14. The method of claim 1, wherein the plurality of key landmarks is a subset of a plurality of control points defining a lung shape model, and segmenting a lung boundary in the medical image based on the detected key landmarks comprises:

registering the plurality of control points defining the lung shape model to the medical image based on detected locations of the plurality of key landmarks in the medical image.

15. An apparatus for lung segmentation in a medical image, comprising:

means for detecting a plurality of predetermined key landmarks of a lung in the medical image, wherein the means for detecting a plurality of predetermined key landmarks of a lung in the medical image comprises:

means for detecting one or more discriminative joint contexts in the medical image, each discriminative joint context representing a combination of two or more of the key landmarks, using a respective classifier trained for each discriminative joint context; and means for segmenting a lung boundary in the medical image based on the detected key landmarks.

16. The apparatus of claim 15, wherein the means for detecting a plurality of predetermined key landmarks in the medical image comprises:

means for detecting a top most point of the lung, a lower-left corner point of the lung, a middle top point of a bottom edge of the lung, and a lower-right corner point of the lung in the medical image.

17. The apparatus of claim 16, wherein the means for detecting a top most point of the lung, a lower-left corner point of the lung, a middle top point of a bottom edge of the lung, and a lower-right corner point of the lung in the medical image comprises:

means for detecting a first bounding box defining joint context of the lower-left corner point and the lower-right corner point in the medical image;

means for detecting a second bounding box defining a joint context of the lower-left corner point and the middle top point of the bottom edge in the medical image; and means for detecting a third bounding box defining a context of the top most point.

18. The apparatus of claim 15, wherein the means for segmenting a lung boundary in the medical image based on the detected key landmarks comprises:

means for registering a learned mean shape of the lung to the medical image using a non-rigid transformation based on the detected key landmarks to initialize a lung boundary in the medical image;

means for deforming the lung boundary in the medical image using a non-rigid transform; and means for refining the lung boundary using a trained boundary detector deforming the lung boundary in the medical image using a non-rigid transform.

19. The apparatus of claim 18, wherein the means for segmenting a lung boundary in the medical image based on the detected key landmarks further comprises:

means for smoothing the lung boundary by projecting the lung boundary onto a learned statistical shape space of the lung.

20. The apparatus of claim 15, wherein the plurality of key landmarks is a subset of a plurality of control points defining a lung shape model, and the means for segmenting a lung boundary in the medical image based on the detected key landmarks comprises: means for registering the plurality of control points defining the lung shape model to the medical image based on detected locations of the plurality of key landmarks in the medical image.

21. A non-transitory computer readable medium storing computer program instructions for lung segmentation in a medical image, the computer program instructions when executed on a processor cause the processor to perform operations comprising:
  detecting a plurality of predetermined key landmarks of a lung in the medical image, wherein detecting a plurality of predetermined key landmarks of a lung in the medical image comprises:
    detecting one or more discriminative joint contexts in the medical image, each discriminative joint context representing a combination of two or more of the key landmarks, using a respective classifier trained for discriminative joint context; and
  segmenting a lung boundary in the medical image based on the detected key landmarks.

22. The non-transitory computer readable medium of claim 21, wherein detecting a plurality of predetermined key landmarks in the medical image comprises:
  detecting a top most point of the lung, a lower-left corner point of the lung, a middle top point of a bottom edge of the lung, and a lower-right corner point of the lung in the medical image.

23. The non-transitory computer readable medium of claim 22, wherein detecting a top most point of the lung, a lower-left corner point of the lung, a middle top point of a bottom edge of the lung, and a lower-right corner point of the lung in the medical image comprises:
  detecting a first bounding box defining joint context of the lower-left corner point and the lower-right corner point in the medical image;
  detecting a second bounding box defining a joint context of the lower-left corner point and the middle top point of the bottom edge in the medical image; and
  detecting a third bounding box defining a context of the top most point.

24. The non-transitory computer readable medium of claim 21, wherein segmenting a lung boundary in the medical image based on the detected key landmarks comprises:
  initializing a lung boundary in the medical image by registering a learned mean shape of the lung to the medical image using a non-rigid transformation based on the detected key landmarks;
  deforming the lung boundary in the medical image using a non-rigid transform; and
  refining the lung boundary using a trained boundary detector deforming the lung boundary in the medical image using a non-rigid transform.

25. The non-transitory computer readable medium of claim 24, wherein segmenting a lung boundary in the medical image based on the detected key landmarks further comprises:
  smoothing the lung boundary by projecting the lung boundary onto a learned statistical shape space of the lung.

26. The non-transitory computer readable medium of claim 21, wherein the operations further comprise:
  repeating the detecting and segmenting operations for each frame of a medical image sequence.

27. The non-transitory computer readable medium of claim 21, wherein the plurality of key landmarks is a subset of a plurality of control points defining a lung shape model, and segmenting a lung boundary in the medical image based on the detected key landmarks comprises:
  registering the plurality of control points defining the lung shape model to the medical image based on detected locations of the plurality of key landmarks in the medical image.

* * * * *